United States Patent
Yamaguchi et al.

(10) Patent No.: US 6,974,376 B2
(45) Date of Patent: Dec. 13, 2005

(54) AIR CONDITIONER FOR VEHICLE WITH NOISE-REDUCTION MEANS

(75) Inventors: Hidehiko Yamaguchi, Anjo (JP); Kazuaki Murashima, Oobu (JP); Hiroshi Kanda, Oobu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/793,505

(22) Filed: Mar. 4, 2004

(65) Prior Publication Data

US 2004/0185765 A1      Sep. 23, 2004

(30) Foreign Application Priority Data

Mar. 7, 2003    (JP) .............................. 2003-061371

(51) Int. Cl.[7] .............................................. B60H 1/03
(52) U.S. Cl. ...................... 454/146; 181/225; 454/143; 454/906
(58) Field of Search ........................... 454/69, 121, 126, 454/143, 146, 147, 148, 156, 159, 160, 161, 454/906; 181/225

(56) References Cited

U.S. PATENT DOCUMENTS 5,478,274 A * 12/1995 Danieau ...................... 454/126
5,679,074 A * 10/1997 Siegel ......................... 454/147

FOREIGN PATENT DOCUMENTS

| JP | 61259000 A | * 11/1986 | .......... F04D 29/66 |
| JP | 62129600 A | * 6/1987 | .......... F04D 29/44 |
| JP | 03168399 A | * 7/1991 | .......... F04D 29/66 |
| JP | 03284317 A | * 12/1991 | .......... B01D 46/42 |
| JP | 4-11346 | 1/1992 | |
| JP | 4-43508 | 4/1992 | |
| JP | 10-236130 | 9/1998 | |

* cited by examiner

*Primary Examiner*—Harold Joyce
(74) *Attorney, Agent, or Firm*—Harness, Dickey & Pierce, PLC (57) ABSTRACT

A flow straightening grid 30 is provided at an area where the air flow turns about 180 degrees in an air path 23, or in the vicinity thereof. Because of this, the air flow can be prevented from being disturbed in the air path 23 and, therefore, noise caused by the disturbance of the air flow can be reduced effectively.

8 Claims, 7 Drawing Sheets

ENLARGED A PORTION

Fig.7

PRIOR ART

AIR CONDITIONER FOR VEHICLE WITH NOISE-REDUCTION MEANS

BACKGROUND OF THE INVENTION

1. Field of the Invention

The present invention relates to an air conditioner for a vehicle.

2. Description of the Related Art

In a conventional air conditioner for a vehicle, noise generated when an air flow crosses an impeller and noise generated around a suction part and a discharge part of a cross flow fan (refer to JIS (Japanese Industrial Standard) B 0132 No. 1017) is reduced by providing a flow straightening grid at the suction side of the cross flow fan (refer to, for example, Patent document 1).

[Patent document 1]

Japanese Unexamined Patent Publication (Kokai) No. 10-236130

By the way, depending on the type of a vehicle, there may be a case where an inside/outside air switching unit has to be arranged at a place offset with respect to the rotation axis of a blower, that is, the blower itself, on account of restrictions of the arrangement in the vehicle, and if the inside/outside air switching unit is arranged offset with respect to the blower, in many cases, the inside air flow has to, for example, make a U-turn so as to turn the direction of flow about 180 degrees in the inside/outside air switching unit.

Figure 7:
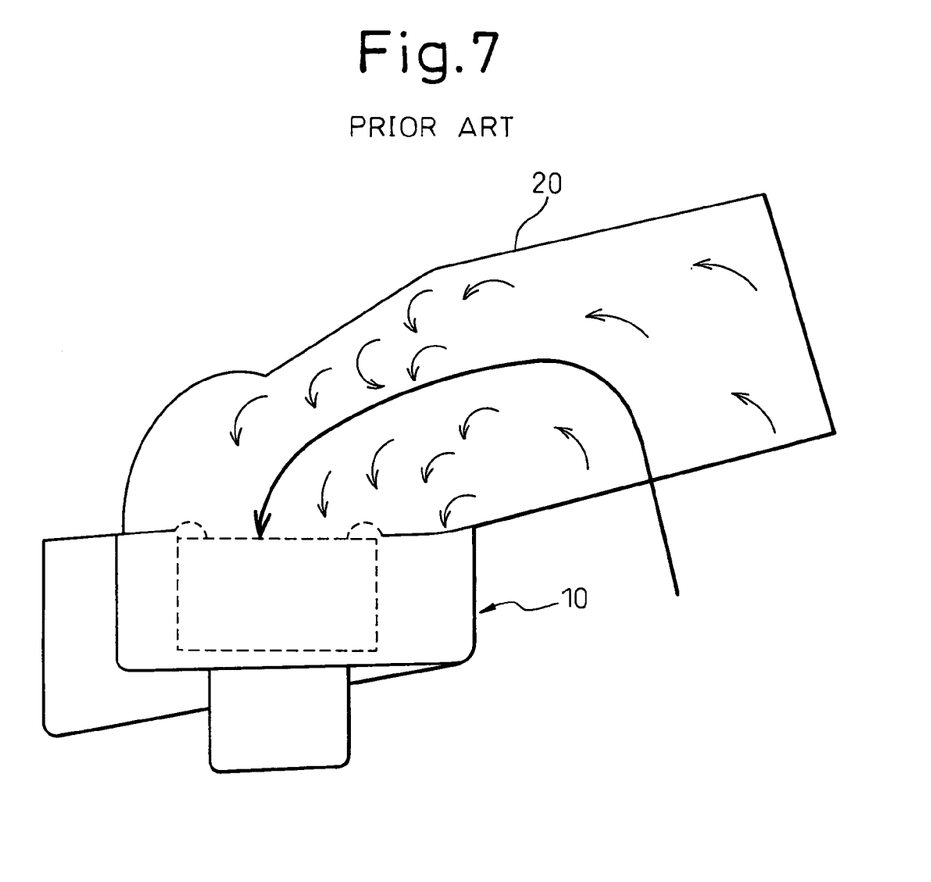
FIG. 7 is a schematic diagram of an air conditioner according to the prior art.

If an air flow makes a U-turn in the inside/outside air switching unit, the air flow is disturbed and noise is likely to be generated as shown in FIG. 7.

SUMMARY OF THE INVENTION

The above-mentioned problem being taken into consideration, the first object of the present invention is to provide a novel air conditioner for a vehicle different from a conventional one and the second object is to reduce noise caused by the disturbance of the air flow.

In order to attain the above-mentioned objects, in a first aspect according to the present invention, an air conditioner comprising: a blower (10) for sending air into a compartment; an inside/outside air switching unit (20) arranged on an air suction side of the blower (10) and for adjusting flow rate of inside air and flow rate of outside air to be supplied to the blower (10), and a flow straightening means (30) arranged on the way in an air path (23) from an air inlet (22) of the inside/outside air switching unit (20) to an air suction port (13a) of the blower (10) and for straightening air flow; wherein the air path (23) is formed into a U-turn shape, thereby the air flow turns substantially 180 degrees on the way in the air path.

Due to this, it is possible to reduce noise generated by the disturbance of the air flow because the air flow is prevented from being disturbed on the way in the air path (23).

In a second aspect according to the present invention, an outside air inlet (21) of the air inlet (22) of the inside/outside air switching unit (20) opens toward a direction substantially the same as that of the air suction port (13a) of the blower (10) and an inside air inlet (22) of the air inlet (22) of the inside/outside air switching unit (20) opens toward a direction substantially opposite to that of the air suction port (13a) of the blower (10).

In a third aspect according to the present invention, the flow straightening means (30) is arranged at an area, where the air flow turns substantially 180 degrees in the air path (23), or in the vicinity thereof.

In a fourth aspect according to the present invention, the flow straightening means (30) is made up so as to have a honeycomb structure in which a plurality of polygonal frame bodies are arranged in parallel to the air flow.

In a fifth aspect according to the present invention, the inside/outside air switching unit is arranged at a place offset toward a side with respect to a point right above the blower, either of the inside air inlet and the outside air inlet is open, as a suction inlet, at a lower portion of the inside/outside air switching unit and the air sucked from the suction inlet open at the lower portion makes a U-turn and is sucked by the blower, and a flow straightening member is provided at an area where the U-turn takes place.

By the way, the symbols in the brackets attached to each means are examples for showing the relation of correspondence with the specific means described in the later embodiments.

The present invention may be more fully understood from the description of the preferred embodiments of the invention set forth below, together with the accompanying drawings.

DESCRIPTION OF THE PREFERRED EMBODIMENTS

Figure 1:
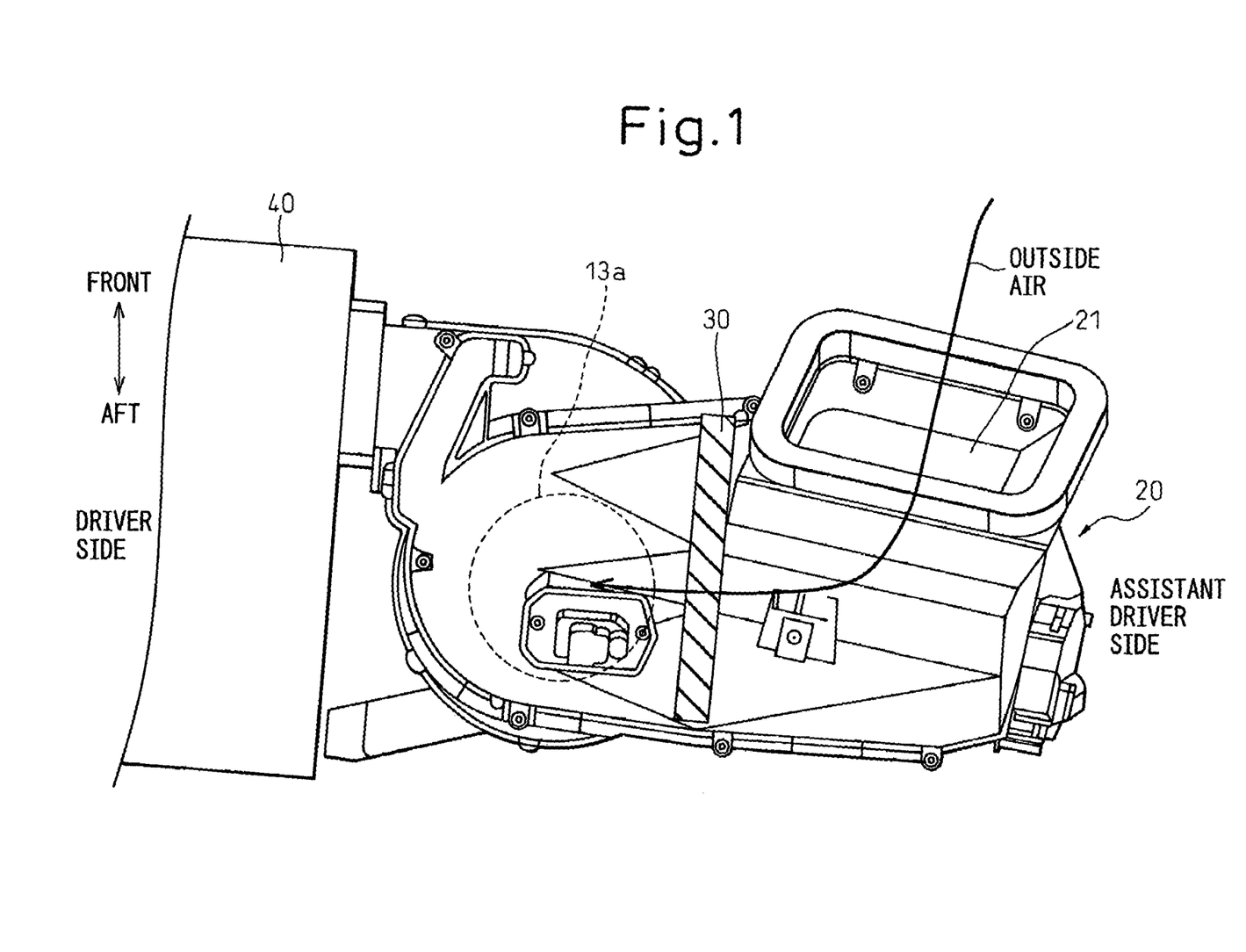
FIG. 1 is a top view of an air conditioner according to an embodiment of the present invention.
Figure 2:
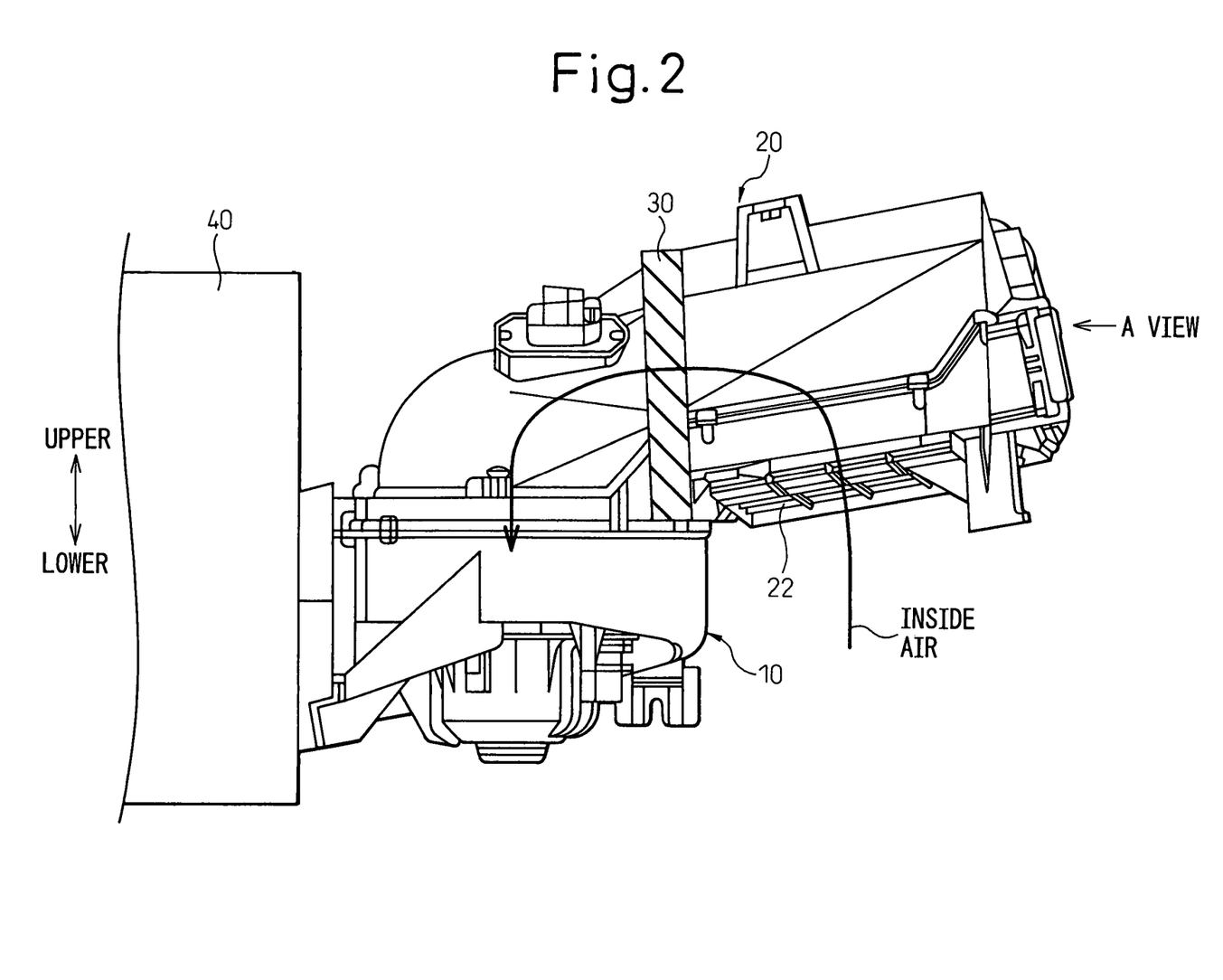
FIG. 2 is a front view of an air conditioner according to the embodiment of the present invention.
Figure 3:
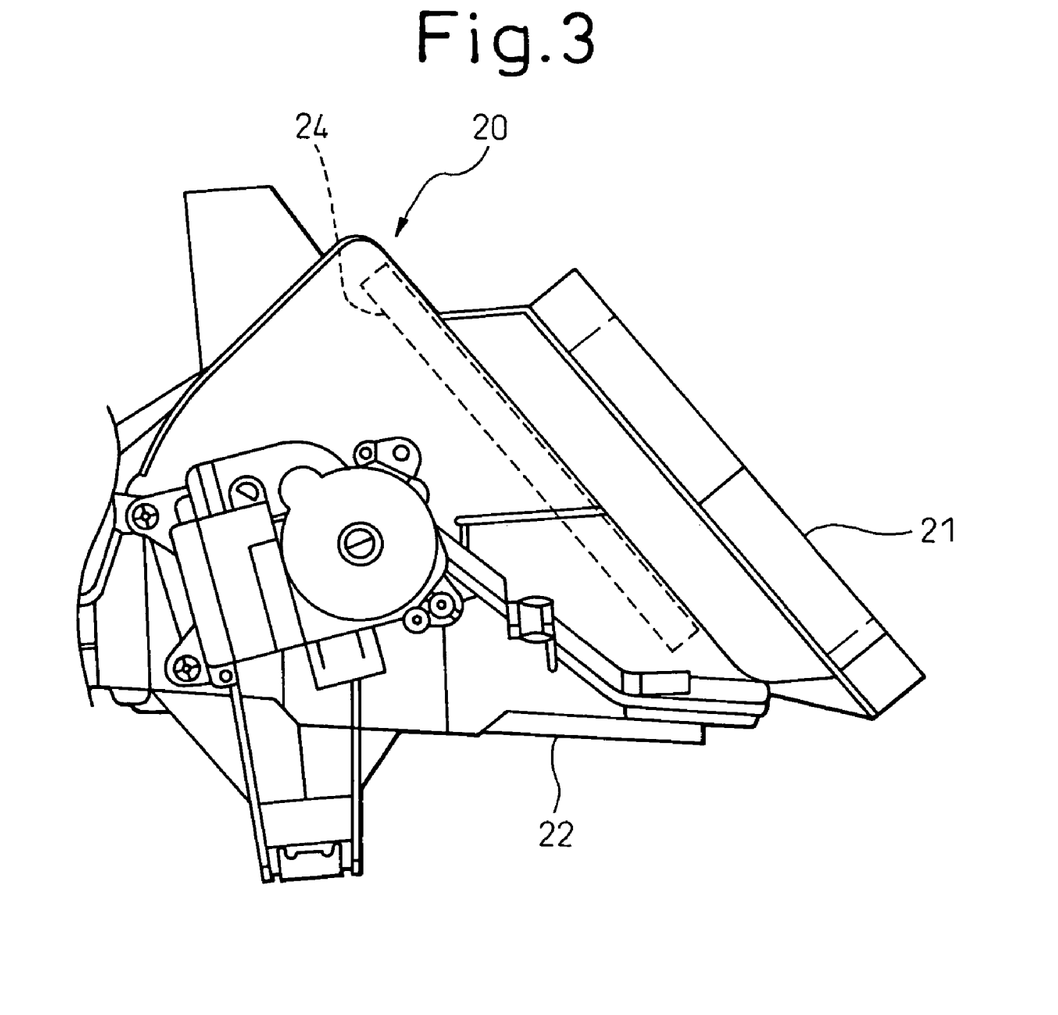
FIG. 3 is a view in the direction of the arrow A in FIG. 2.
Figure 4:
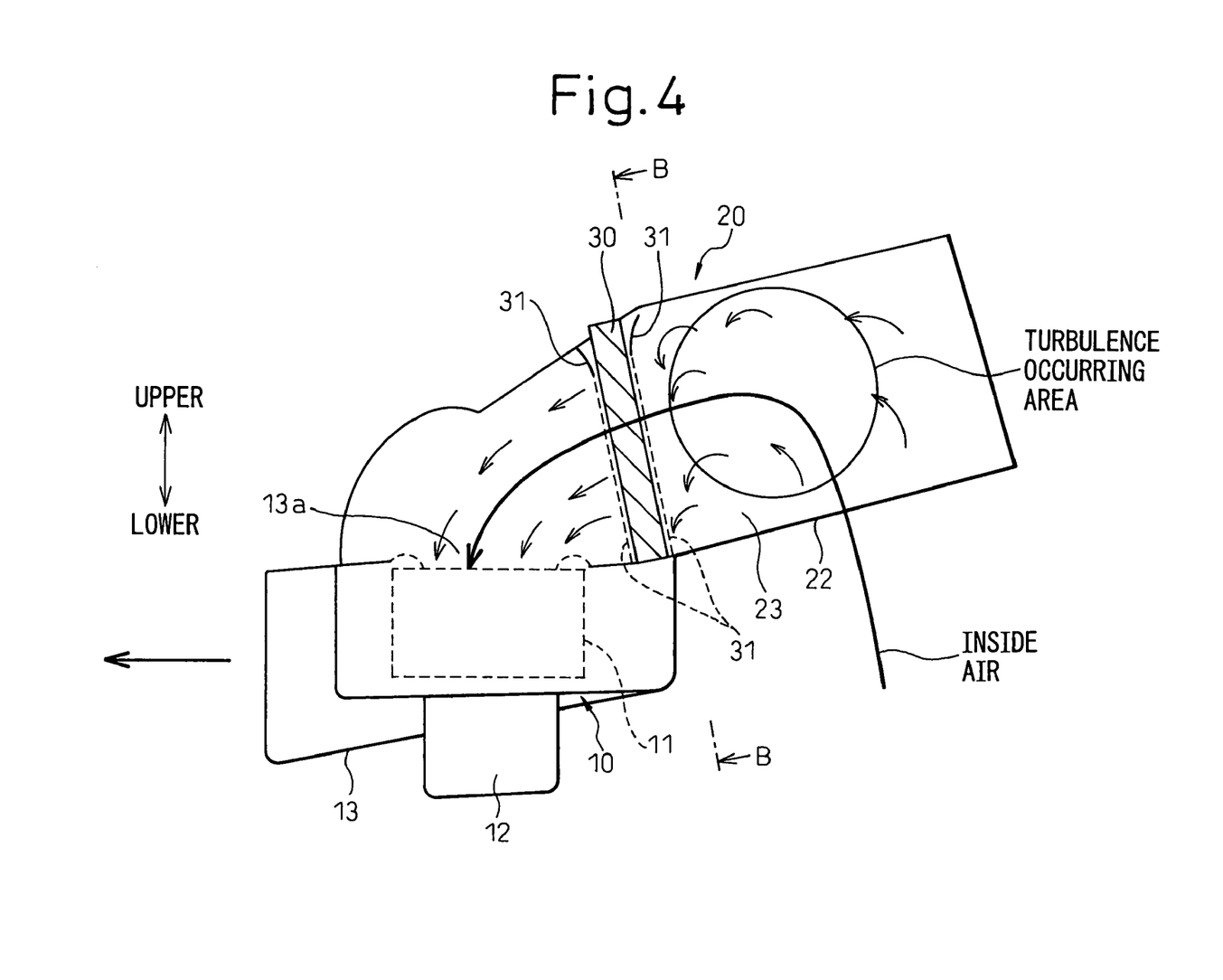
FIG. 4 is a schematic diagram showing air flow in the air conditioner according to the embodiment of the present invention.
Figure 5A:
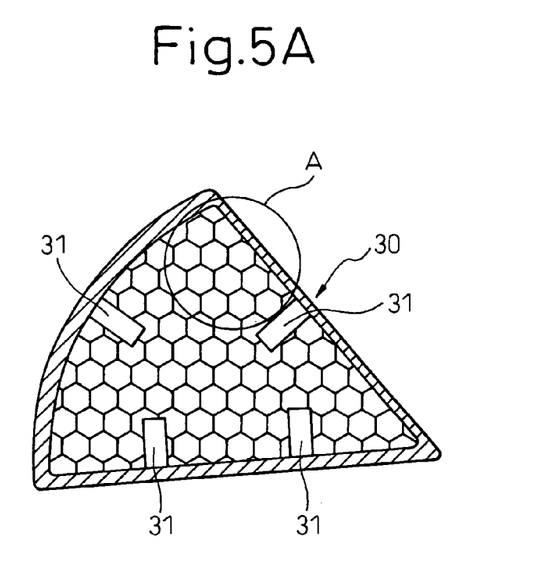
FIG. 5A is a sectional view along the line B—B in FIG. 4.

In the present embodiment, an air conditioner for a vehicle according to the present invention is applied to an air conditioner for a general passenger car, and FIG. 1 is a top view of the air conditioner in the present embodiment, FIG. 2 is a front view of the air conditioner according to the present embodiment, FIG. 3 is a view in the direction of the arrow A in FIG. 2, FIG. 4 is a schematic diagram of the air conditioner showing air flow, and FIG. 5A is a sectional view along the line B—B in FIG. 4.

In FIG. 4, a blower 10, which is an air sending means for sending an air into a compartment, comprises a centrifugal fan 11 for sending the air sucked from the direction of rotating axis radially outward, an electric motor 12 for rotating the fan 11, a scroll casing 13 for accommodating the fan 11 and forming a scroll-shaped air path and, at the same time, for converting the dynamic pressure of the air discharged from the fan 11 into the static pressure, and so on.

An inside/outside air switching unit 20 has an outside air inlet 21 (refer to FIG. 1) for taking in the outside air and an inside air inlet 22 (refer to FIG. 2) for taking in the inside air, and adjusts the flow rate of inside air and the flow rate of outside air to be supplied to the blower 10 by adjusting the opening states of both inlets 21 and 22 by means of an inside/outside air switching door 24 (refer to FIG. 3), and the air introduced into the inside/outside air switching unit 20 is guided to the blower 10, that is, to an air suction port 13*a* of the scroll casing 13.

By the way, the inside/outside air switching unit 20 is arranged offset with respect to the blower 10 and, at the same time, the outside air inlet 21 opens toward the direction substantially the same as that of the air suction port 13*a* and the inside air inlet 22 opens toward the direction substantially opposite to that of the air suction port 13*a* and, therefore, an air path 23 through which the inside air introduced from the inside air inlet 22 flows has a U-turn shape so that the air flow is turned 180 degrees in the air path 23.

In the present embodiment, as the air suction port 13*a* opens upward, the outside air inlet 21 opens substantially upward, as shown in FIG. 3, and the inside air inlet 22 opens substantially downward as shown in FIG. 2.

Figure 5B:
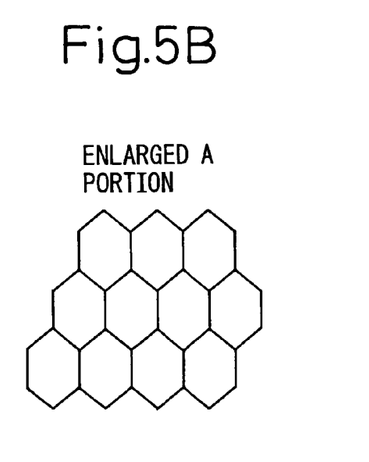
FIG. 5B is an enlarged view of A portion in FIG. 5A.

At an area where the air flow turns about 180 degrees in the air path 23, a flow straightening grid 30 for straightening the air flow is provided as shown in FIG. 4. By the way, the flow straightening grid 30 according to the present embodiment has a honeycomb structure, as shown in FIG. 5 in which a plurality of polygonal (hexagonal, in the present embodiment) frame bodies are formed by the use of film members made of a metal, such as aluminum, and the plurality of polygonal frame bodies are arranged in parallel to the air flow.

In this embodiment, fixing protrusions 31, which are formed so as to protrude inward from an inner wall of the inside/outside air switching unit 20, fix the flow straightening grid 30 to the inside of the inside/outside air switching unit 20 in such a way that the flow straightening grid 30 is sandwiched by the fixing protrusions 31 from an upstream side and a downstream side of the air flow of the flow straightening grid 30.

To the discharge side of the blower 10, an air conditioning unit 40 (refer to FIG. 1 and FIG. 2) accommodating a temperature adjusting means, such as an evaporator and a heater, for adjusting the temperature of the air to be sent into a compartment and an air sending mode switching means for switching the air sending modes, and so on is connected.

Next, the features of the air conditioner for a vehicle according to the present embodiment are explained below.

In the present embodiment, as the flow straightening grid 30 is provided on the way in the air path 23, it is possible to prevent the air flow from being disturbed on the way in the air path 23. Further, noise caused by the disturbance of the air flow can be reduced.

By the way, the disturbance of the air flow is likely to occur at an area where the air flow turns about 180 degrees in the air path 23 or in the vicinity thereof, as shown in FIG. 4 and, therefore, if the flow straightening grid 30 is arranged at the area where the air flow turns about 180 degrees in the air path 23 or in the vicinity thereof, as in the present embodiment, the disturbance of the air flow can be prevented efficiently.

Figure 6:
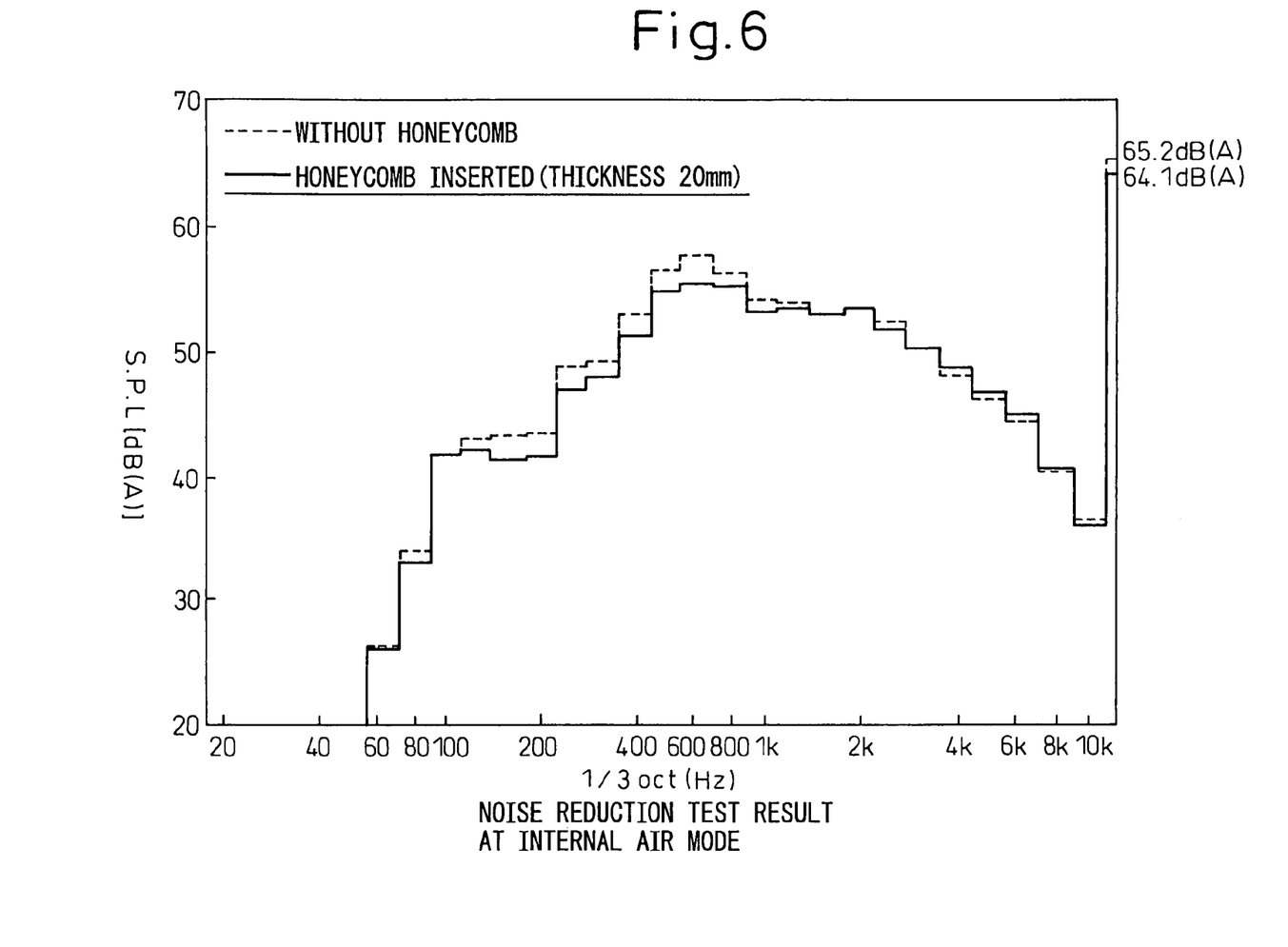
FIG. 6 is a graph showing the noise characteristics.

FIG. 6 shows the result of noise (SPL) measurement when the thickness of the flow straightening grid 30, that is, the dimension of the portion of the flow straightening grid 30 parallel to the air flowing direction, is set to about 20 mm. From this result, it is found that by providing the flow straightening grid 30 when the air flow rate is 540 m³/h, noise is reduced by about 1.1 dB(A) and by about 1.5 dB(A) in the range between 125 Hz and 1 kHz.

OTHER EMBODIMENTS

In the embodiment described above, the air flow makes a U-turn when the inside air flows, but the present invention is not limited to this, and the air flow may make a U-turn when the outside air flows.

Moreover, in the embodiment described above, the flow straightening grid 30 is made up by the use of the honeycomb structure made of aluminum foil, but the present invention is not limited to this, but, for example, a wire mesh or the like may be used. However, if the flow straightening grid 30 is made up of the wire mesh, a large flow resistance of the air flow results, therefore, the size of the wire mesh should be taken into consideration.

While the invention has been described by reference to specific embodiments chosen for the purposes of illustration, it should be apparent that numerous modifications could be made thereto, by those skilled in the art, without departing from the basic concept and scope of the invention.

What is claimed is:

1. An air conditioner for a vehicle comprising:
   a blower for sending air into a compartment;
   an inside/outside air switching unit arranged on an air suction side of the blower and for adjusting flow rate of inside air and flow rate of outside air to be supplied to the blower; and
   flow straightening means arranged in an air path between an air inlet of the inside/outside air switching unit and an air suction port of the blower and for straightening air flow; wherein
   the air path is formed into a U-turn shape, thereby the air flow turns substantially 180 degrees in the air path; and
   the flow straightening means is spaced from the air suction port of the blower and is arranged at an area where the air flow turns substantially 180 degrees in the air path.

2. An air conditioner for a vehicle, as set forth in claim 1, wherein an outside air inlet of the air inlet of the inside/outside air switching unit opens toward a direction substantially the same as that of the air suction port of the blower and an inside air inlet of the air inlet of the inside/outside air switching unit opens toward a direction substantially opposite to that of the air suction port of the blower.

3. An air conditioner for a vehicle, as set forth in claim 1, wherein the flow straightening means is made up so as to have a honeycomb structure in which a plurality of polygonal frame bodies are arranged in parallel to the air flow.

4. An air conditioner for a vehicle, as set forth in claim 1,
   wherein the inside/outside air switching unit is arranged at a place offset toward a side with respect to a point right above the blower, either of the inside air inlet and the outside air inlet is open, as a suction inlet, at a lower portion of the inside/outside air switching unit and the air sucked from the suction inlet open at the lower portion makes a U-turn and is sucked by the blower, and
   wherein a flow straightening member is provided at an area where the U-turn takes place.

5. An air conditioner for a vehicle comprising:
   a blower for sending air into a compartment;
   an inside/outside air switching unit arranged on an air suction side of the blower and for adjusting flow rate of inside air and flow rate of outside air to be supplied to the blower; and flow straightening means arranged in an air path between an air inlet of the inside/outside air switching unit and an air suction port of the blower and for straightening air flow; wherein the air path is formed into a U-turn shape, thereby all the air flow turns substantially 180 degrees in the air path prior to entering the air suction port of the blower;

the inside/outside air switching unit is arranged at a place offset toward a side with respect to a point right above the blower, either of an inside air inlet and an outside air inlet is open, as a suction inlet, at a lower portion of the inside/outside air switching unit and the air sucked from the suction inlet open at the lower portion makes a U-turn and is sucked by the blower, and flow straightening member is provided at an area where the U-turn takes place.

6. An air conditioner for a vehicle, as set forth in claim 5, wherein the outside air inlet of the air inlet of the inside/outside air switching unit opens toward a direction substantially the same as that of the air suction port of the blower and the inside air inlet of the air inlet of the inside/outside air switching unit opens toward a direction substantially opposite to that of the air suction port of the blower.

7. An air conditioner for a vehicle, as set forth in claim 5, wherein the flow straightening means is arranged at an area where the air flow turns substantially 180 degrees in the air path, or in the vicinity thereof.

8. An air conditioner for a vehicle, as set forth in claim 5, wherein the flow straightening means is made up so as to have a honeycomb structure in which a plurality of polygonal frame bodies are arranged in parallel to the air flow.

* * * * *